United States Patent
Asprion

(10) Patent No.: US 8,476,475 B2
(45) Date of Patent: Jul. 2, 2013

(54) PREMIXTURE FOR PREPARING AN ABSORBENT FOR REMOVING ACIDIC GASES FROM FLUID STREAMS

(75) Inventor: Norbert Asprion, Ludwigshafen (DE)

(73) Assignee: BASF SE, Ludwigshafen (DE)

(*) Notice: Subject to any disclaimer, the term of this patent is extended or adjusted under 35 U.S.C. 154(b) by 55 days.

(21) Appl. No.: 12/301,477

(22) PCT Filed: May 18, 2007

(86) PCT No.: PCT/EP2007/054836
§ 371 (c)(1),
(2), (4) Date: Apr. 23, 2010

(87) PCT Pub. No.: WO2007/135100
PCT Pub. Date: Nov. 29, 2007

(65) Prior Publication Data
US 2010/0204042 A1    Aug. 12, 2010

(30) Foreign Application Priority Data
May 19, 2006 (EP) .................................. 06114244

(51) Int. Cl.
C07C 215/06  (2006.01)
C07C 215/12  (2006.01)
C07D 295/027  (2006.01)
C07D 241/04  (2006.01)
B01D 53/40  (2006.01)

(52) U.S. Cl.
USPC .......... 564/503; 564/506; 544/358; 423/210; 423/220; 423/226; 423/228; 423/229

(58) Field of Classification Search
USPC .......... 423/210, 220, 226, 228, 229; 564/503, 564/506; 544/358
See application file for complete search history.

(56) References Cited

U.S. PATENT DOCUMENTS

| 4,336,233 A | 6/1982 | Appl et al. |
| 5,618,506 A * | 4/1997 | Suzuki et al. ................. 423/228 |
| 6,939,393 B2 | 9/2005 | Asprion et al. |

FOREIGN PATENT DOCUMENTS

| DE | 102004011427 | 9/2005 |
| EP | 0879631 A1 | 11/1998 |
| WO | WO-0066249 A1 | 11/2000 |
| WO | WO-0209849 | 2/2002 |
| WO | WO-03009924 A1 | 2/2003 |
| WO | WO-03076049 | 9/2003 |

OTHER PUBLICATIONS

Samanta et al., "Density and Viscosity of Aqueous Solutions of Piperazine and (2-Amino-2-methyl-1-propanol+Piperazine) from 298 to 333 K." J. Chem. Eng. Data (2006), vol. 51, pp. 467-470 (published on Web Feb. 4, 2006).*

(Continued)

Primary Examiner — Daniel C McCracken
Assistant Examiner — Daniel Berns
(74) Attorney, Agent, or Firm — Novak Druce Connolly Bove + Quigg LLP

(57) ABSTRACT

A premix is described for producing an absorption medium for removing acid gases from fluid streams. The premix comprises at least one alkanolamine, piperazine and water, the premix having a total amine content of more than 65% by weight, the molar ratio of water to piperazine in the premix being 1.6 to 4.8. The premix is characterized by a low solidification point. It is diluted with water and/or alkanolamine to give the ready-to-use absorption medium.

15 Claims, 1 Drawing Sheet

OTHER PUBLICATIONS

Sciencelab.com, Inc., "Piperazine, anhydrous MSDS." Oct. 10, 2005. Viewed on Aug. 10, 2012 at http://www.sciencelab.com/msds.php?msdsId=9926575.*

International Preliminary Report on Patentability issued in corresponding International Application No. PCT/EP2007/054836 on Feb. 9, 2009.

* cited by examiner

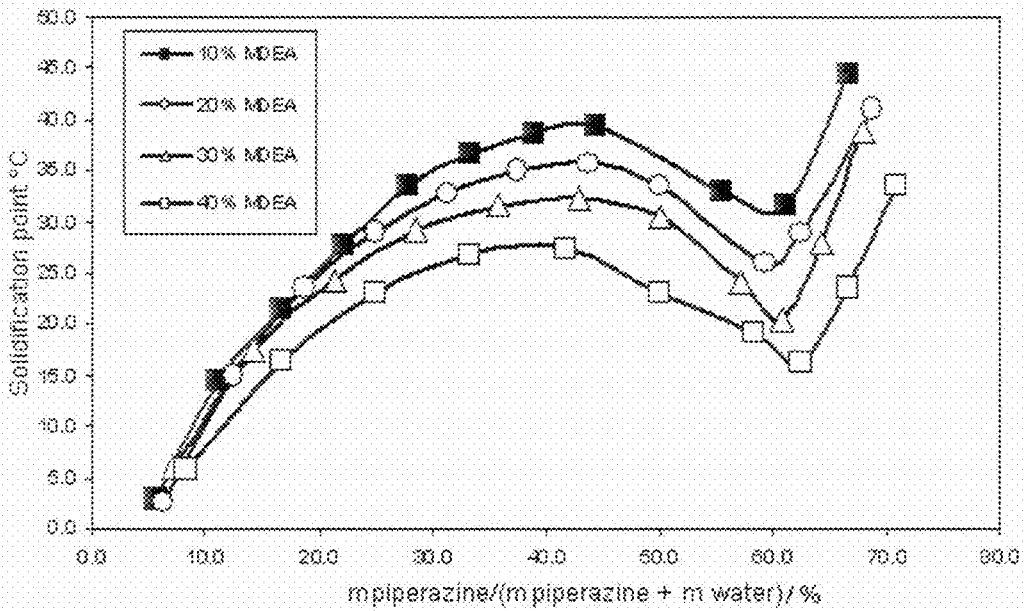

PREMIXTURE FOR PREPARING AN ABSORBENT FOR REMOVING ACIDIC GASES FROM FLUID STREAMS

CROSS REFERENCE TO RELATED APPLICATIONS

This application is a 35 U.S.C. 371 National Stage Application of International Application No. PCT/EP2007/054836, filed May 18, 2007, claiming priority from European Application No. 06114244.4, filed May 19, 2006, the entire contents of which are incorporated herein by reference in their entireties.

The present invention relates to a premix for producing an absorption medium for removing acid gases from fluid streams, and to a process for producing an absorption medium.

In numerous processes in the chemical industry fluid streams occur which comprise acid gases such as $CO_2$, $H_2S$, $SO_2$, $CS_2$, HCN, COS or mercaptans, for example. These fluid streams can be, for example, gas streams such as natural gas, refinery gas, synthesis gas, flue gases, or reaction gases formed in the composting of waste materials comprising organic substances.

Removal of the acid gases is of particular importance for differing reasons. The sulphur compound content of natural gas must be reduced by suitable preparation measures directly at the natural gas source, since the sulphur compounds, in the water which is frequently entrained by the natural gas, also form acids which are corrosive. To transport the natural gas in a pipeline, therefore preset limiting values of sulphurous impurities must be met. The reaction gases formed in the oxidation of organic materials such as, for example, organic wastes, coal or mineral oil, or in the composting of waste materials comprising organic substances, must be removed in order to prevent the emission of gases which damage the natural environment or can affect the climate.

To remove acid gases, use is made of scrubbing with solutions of inorganic or organic bases. When acid gases are dissolved in the absorption medium, ions form with the bases. The absorption medium can be regenerated by expansion to a lower pressure or by stripping, the ionic species reacting back to form acid gases and/or being stripped off by steam. After the regeneration process the absorption medium can be reused.

For removing $CO_2$ from flue gases, EP-A 879 631 recommends an aqueous amine solution which comprises a secondary amine and a tertiary amine, each in concentrations of 10 to 45% by weight.

The absorption medium described in U.S. Pat. No. 4,336,233 is proved in practice. This is an aqueous solution of methyldiethanolamine (MDEA) and piperazine as absorption accelerator or activator. The scrubbing liquid described there comprises 1.5 to 4.5 mol/l of methyldiethanolamine (MDEA) and 0.05 to 0.8 mol/l, preferably up to 0.4 mol/l, of piperazine.

WO 03/009924 discloses a process for removing acid gases from a gas stream, in which a gas stream comprising the acid gases in which the sum of the partial pressures of the acid gases does not exceed 1500 mbar is contacted in an absorption step with an aqueous absorption medium and use is made of an absorption medium which comprises at least one tertiary alkanolamine and piperazine in a concentration of at least 8% by weight of the absorption medium.

WO 00/66249 discloses an absorption medium for removing acid gases which comprises an aqueous solution having more than 1 mol/l of piperazine and 1.5 to 6 mol of methyldiethanolamine.

The aqueous solutions comprise a high fraction of water. On transport of the absorption medium to the gas treatment unit, attempts are made to keep the water fraction as low as possible in order to minimize transport costs. Although it is possible in principle to transport pure methyldiethanolamine and pure piperazine, piperazine is a solid at ambient temperatures; its dusts have a sensitizing action. To dissolve solid piperazine, mixing devices are required, such as agitators or solids-compatible pumps and if appropriate heat sources. In addition, safety measures for staff must be provided, for example extractors and full protective equipment. Such facilities are not generally present at the locations of gas treatment units.

Attempts have already been made to produce concentrated premixes which have a higher total amine content than the ready-to-use absorption medium. The premix can be diluted with water at the gas treatment unit. The transport of such concentrated premixes, however, is made more difficult by the fact that piperazine starts to crystallize out from the concentrated solutions even at a comparatively high temperature. If the piperazine has started to crystallize, the premix can no longer be pumped and the contaminated containers must be cleaned in a complex manner. The piperazine can only be redissolved by one or more of the above-described measures. It is obvious that a premix is more useful, the lower its solidification point.

The object of the invention is therefore to specify a concentrated premix for an absorption medium which comprises piperazine and at least one alkanolamine, the solidification point of which is as low as possible.

It has now been found that the solidification point of the premix is greatly dependent on the molar ratio of water to piperazine in the premix and that the solidification point has a minimum under defined conditions.

The object is achieved according to the invention by a premix for producing an absorption medium for removing acid gases from fluid streams, which premix comprises at least one alkanolamine, piperazine and water, in which the premix has a total amine content of more than 65% by weight, and the molar ratio of water to piperazine in the premix is 1.6 to 4.8, preferably 1.6 to 3.9, more preferably 1.6 to 3.45, and most preferably 1.6 to 3.35.

For use in the premix according to the invention, all alkanolamines are suitable which are customarily used to remove acid gases from fluid streams. These encompass, for example, monoethanolamine (MEA), diethanolamine (DEA), triethanolamine (TEA), diethylethanolamine (DEEA), methyldiethanolamine (MDEA), methyldiisopropanolamine (MDIPA) or mixtures thereof.

Suitable alkanolamines are, in particular, those of the general formula

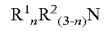

where $R^1$ is hydroxy-$C_2$-$C_3$-alkyl, $R^2$ is $C_1$-$C_3$-alkyl and n is an integer from 1 to 3, preferably 1 or 2, most preferably 2.

Of these, preference is given to methyldiethanolamine and methyldiisopropanolamine, methyldiethanolamine being most preferred.

Suitable alkanolamines are, furthermore, primary alkanolamines (that is to say those which have a primary amino group), in which a tertiary carbon atom is bound to the amino group. Of these 2-amino-2-methylpropanol (2-AMP) is preferred.

The weight ratio of alkanolamine to piperazine in the premix of the invention is not critical, but is generally 1:7 to 28:1, preferably 1:3 to 28:1, particularly preferably 1:1.5 to 28:1.

The total amine content of the premix according to the invention is more than 65% by weight, preferably more than 70% by weight, and particularly preferably more than 75% by weight. Total amine content is taken to mean the sum of the weight of alkanolamine and piperazine based on the total weight of the premix.

On the industrial scare, piperazine is usually obtained in the production of various ethyleneamines as one of the products of value. In this case the synthesis is based on the reaction of ethylene dichloride (EDC process) or monoethanolamine (MEOA process) with ammonia. Further coupled products of this reaction are ethylenediamine, diethylenetriamine, triethylenetetramine and higher linear and cyclic ethyleneamines, and also additionally aminoethylethanolamine in the MEOA process. The ethyleneamine product mixture is usually purified and separated in the industrial production via a cascade of columns in continuous operation. First, in this case, the ammonia is taken off in a pressurized column, thereafter the process water formed is distilled off. In most of these processes an aqueous piperazine solution is obtained having a concentration of 50 to 75% by weight, usually about 67% by weight. The molar ratio of water to piperazine in the 67% strength by weight solution is about 2.25. Such aqueous solutions are particularly preferred starting materials for producing the premix of the invention. The aqueous piperazine solution is admixed only with the desired amount of alkanolamine and if appropriate small amounts of water. The complex production of solid piperazine is not required.

The premix of the invention generally has a solidification point of below 40° C., preferably below 35° C., usually 15 to 30° C. It can be transported and stored without problems in heated and/or thermally insulated vessels over long distances.

The premix of the invention can comprise further functional components such as stabilizers, in particular antioxidants, see, for example, DE 102004011427, or corrosion inhibitors.

For production of the ready-to-use absorption medium, the premix of the invention is diluted with the desired amounts of water and if appropriate alkanolamine. Expediently, use is made of the same alkanolamine as is present in the premix. Obviously, to dilute the premix, an aqueous alkanolamine solution can also be used. The ready-to-use absorption medium typically has a total amine content of less than 70% by weight, for example less than 65% by weight, usually less than 60% by weight, for example 35 to 55% by weight.

To prepare an absorption medium for starting up a gas-treatment unit for the first time, the premix according to the invention is admixed with those amounts of water and alkanolamine which establish the desired concentrations of piperazine and alkanolamine in the finished mixture.

The premix of the invention may also be used for replacing losses of alkanolamine and/or piperazine. Losses of alkanolamine and/or piperazine occur during operation of a gas-treatment unit for various reasons, in particular owing to leaks, decomposition or because traces of alkanolamine and/or piperazine are removed together with the treated gas. In the case of an absorption medium which is intended to replace losses, it is necessary to take into account the differing volatilities and/or decomposition rates of piperazine and alkanolamine. Since piperazine is generally more volatile than the alkanolamine, a relatively higher amount of piperazine must be supplemented in operation. In this case, the premix of the invention is diluted only with water or a smaller amount of alkanolamine than corresponds to the theoretical composition of the absorption medium.

The invention will be illustrated in more detail by the accompanying figures and the examples hereinafter.

FIG. 1 shows the solidification points of ternary mixtures of methyldiethanolamine/piperazine/water as a function of the piperazine-water ratio for various contents of methyldiethanolamine.

EXAMPLE 1

Ternary mixtures of methyldiethanolamine/piperazine/water were prepared having methyldiethanolamine contents of 10, 20 and 40% by weight. The weight fraction of piperazine, based on the sum of piperazine and water, was varied from 5 to 70% by weight. The temperatures of the prepared mixtures at which solids formation was first observable (liquidus line) were determined. The results are shown in FIG. 1. It may be seen that at a content of about 62% by weight of piperazine, based on the sum of piperazine and water, the mixtures have a solidification point minimum.

EXAMPLE 2

Ternary mixtures were prepared of methyldiethanolamine (MDEA)/piperazine (PIP)/water having a weight ratio of methyldiethanolamine/piperazine of 1:1, 2:1, 3:1 and 1.5:1 and differing water contents, and the solidification points of the mixtures thus produced were determined. The compositions (in % by weight), the molar ratio water/piperazine $X(H_2O/PIP)$ and the solidification points (in ° C.) are summarized in the table below. The solidification points are reported as the result of three individual measurements and as mean.

| MDEA:PIP = 1:1 | | | | | | | |
|---|---|---|---|---|---|---|---|
| MDEA | PIP | Water | $X(H_2O/PIP)$ | Solidification point | | | MEAN |
| 33.3 | 33.3 | 33.3 | 4.78 | 28.0 | 28.0 | 28.5 | 28.2 |
| 35.5 | 35.5 | 29.0 | 3.92 | 24.5 | 25.0 | 25.0 | 24.8 |
| 37.5 | 37.5 | 25 | 3.19 | 18.0 | 18.5 | 18.5 | 18.3 |
| 39.4 | 39.4 | 21.2 | 2.58 | 21.0 | 20.5 | 21.0 | 20.8 |
| 41.2 | 41.2 | 17.6 | 2.05 | 28.5 | 28.5 | 28.5 | 28.5 |

| MDEA:PIP = 1.5:1 | | | | | | | |
|---|---|---|---|---|---|---|---|
| MDEA | PIP | Water | $X(H_2O/PIP)$ | Solidification point | | | MEAN |
| 42.8 | 28.6 | 28.6 | 4.78 | 21.0 | 20.5 | 21.0 | 20.8 |
| 45.2 | 30.1 | 24.7 | 3.92 | 16.5 | 16.0 | 16.0 | 16.2 |
| 47.4 | 31.6 | 21.0 | 3.19 | 7.5 | 7.0 | 7.5 | 7.3 |
| 49.4 | 32.9 | 17.7 | 2.58 | 10.0 | 10.0 | 10.0 | 10.0 |
| 51.2 | 34.1 | 14.7 | 2.05 | 17.0 | 16.0 | 16.0 | 16.3 |

| MDEA:PIP = 2:1 | | | | | | | |
|---|---|---|---|---|---|---|---|
| MDEA | PIP | Water | $X(H_2O/PIP)$ | Solidification point | | | MEAN |
| 50 | 25 | 25 | 4.78 | 16.0 | 16.5 | 16.0 | 16.2 |
| 52.4 | 26.2 | 21.4 | 3.92 | 11.0 | 11.0 | 11.5 | 11.2 |
| 54.5 | 27.3 | 18.2 | 3.19 | no crystallization | | | |
| 56.5 | 28.3 | 15.2 | 2.58 | from −20° C. very viscous | | | |
| 58.3 | 29.2 | 12.5 | 2.05 | −40° C. vitrious solid | | | |

| MDEA:PIP = 3:1 | | | | |
| --- | --- | --- | --- | --- |
| MDEA | PIP | Water | X(H₂O/PIP) | Solidification point |
| 60.0 | 20.0 | 20.0 | 4.78 | no crystallization |
| 62.3 | 20.7 | 17.0 | 3.92 | from −20° C. very viscous |
| 54.5 | 27.3 | 18.2 | 3.19 | −40° C. vitrious solid |
| 56.5 | 28.3 | 15.2 | 2.58 | |
| 58.3 | 29.2 | 12.5 | 2.05 | |

EXAMPLE 3

Example 2 was repeated, but use was made of ternary mixtures of methyldiisopropanolamine (MDIPA)/piperazine (PIP)/water having a weight ratio of methyldiisopropanolamine/piperazine of 1:1. The compositions (in % by weight), the molar ratio water/piperazine X(H₂O/PIP) and the solidification points (in ° C.) are summarized in the table below.

| MDIPA:PIP = 1:1 | | | | | | | |
| --- | --- | --- | --- | --- | --- | --- | --- |
| MDIPA | PIP | Water | X(H₂O/PIP) | Solidification point | | | MEAN |
| 33.3 | 33.3 | 33.3 | 4.78 | 36.0 | 35.0 | 36.0 | 35.7 |
| 35.5 | 35.5 | 29.0 | 3.92 | 33.0 | 33.0 | 33.0 | 33.0 |
| 37.5 | 37.5 | 25   | 3.19 | 29.0 | 29.0 | 29.0 | 29.0 |
| 39.4 | 39.4 | 21.2 | 2.58 | 26.0 | 26.0 | 27.0 | 26.3 |
| 41.2 | 41.2 | 17.6 | 2.05 | 34.0 | 35.0 | 34.0 | 34.3 |

EXAMPLE 4

Example 2 was repeated, but use was made of ternary mixtures of 2-amino-2-methyl-propanol (2-AMP)/piperazine (PIP)/water having a weight ratio of 2-amino-2-methyl-propanol/piperazine of 1:1. The compositions (in % by weight), the molar ratio water/piperazine X(H₂O/PIP) and the solidification points (in ° C.) are summarized in the table below.

| 2-AMP:PIP = 1:1 | | | | | | | |
| --- | --- | --- | --- | --- | --- | --- | --- |
| 2-AMP | PIP | Water | X(H₂O/PIP) | Solidification point | | | MEAN |
| 33.3 | 33.3 | 33.3 | 4.78 | 29.0 | 28.0 | 28.0 | 28.3 |
| 35.5 | 35.5 | 29.0 | 3.92 | 21.0 | 21.0 | 21.0 | 21.0 |
| 37.5 | 37.5 | 25   | 3.19 | 18.0 | 19.0 | 19.0 | 18.7 |
| 39.4 | 39.4 | 21.2 | 2.58 | 26.0 | 26.0 | 26.0 | 26.0 |
| 41.2 | 41.2 | 17.6 | 2.05 | 32.0 | 33.0 | 33.0 | 32.7 |

The invention claimed is:

1. A premix for producing an absorption medium for removing acid gases from fluid streams comprising at least one alkanolamine, piperazine and water, in which the premix has a total amine content of more than 65% by weight, the piperazine content of the premix is from 20.7 to 41.2% by weight and the molar ratio of water to piperazine in the premix is 1.6 to 4.8, wherein the premix has a solidification point below 35° C.

2. The premix according to claim 1, in which the molar ratio of water to piperazine in the premix is 1.6 to 3.9.

3. The premix according to claim 1, in which the alkanolamine has the general formula $R^1{}_n R^2{}_{(3-n)} N$, where $R^1$ is hydroxyl-$C_2$-$C_3$-alkyl, $R^2$ is $C_1$-$C_3$-alkyl and n is an integer from 1 to 3.

4. The premix according to claim 3, in which the alkanolamine is selected from methyl-diethanolamine and methyl-diisopropanolamine.

5. The premix according to claim 1, in which the alkanolamine is a primary alkanolamine, where a tertiary carbon atom is bound to the amino group.

6. The premix according to claim 5, in which the alkanolamine is 2-amino-2-methyl-propanol.

7. The premix according to claim 1, in which the weight ratio of alkanolamine to piperazine in the premix is 1:7 to 28:1.

8. The premix according to claim 7, in which the weight ratio of alkanolamine to piperazine in the premix is 1:3 to 28:1.

9. The premix according to claim 1, in which the total amine content is more than 70% by weight.

10. A process for producing an absorption medium for removing acid gases from fluid streams, in which a premix according to claim 1 is mixed with water.

11. The process of claim 10, wherein the premix is additionally mixed with an alkanolamine.

12. The premix of claim 1, wherein the piperazine content of the premix is from 25 to 41.2% by weight.

13. The premix of claim 12, wherein the piperazine content of the premix is from 25 to 29.2% by weight.

14. The premix of claim 12, wherein the piperazine content of the premix is from 28.6 to 34.1% by weight.

15. The premix of claim 12, wherein the piperazine content of the premix is from 33.3 to 41.2% by weight.

* * * * *

UNITED STATES PATENT AND TRADEMARK OFFICE
CERTIFICATE OF CORRECTION

PATENT NO. : 8,476,475 B2  Page 1 of 1
APPLICATION NO. : 12/301477
DATED : July 2, 2013
INVENTOR(S) : Norbert Asprion It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Eighth Day of September, 2015

Michelle K. Lee
*Director of the United States Patent and Trademark Office*